United States Patent [19]

Fermann et al.

[11] Patent Number: 5,627,848
[45] Date of Patent: May 6, 1997

[54] APPARATUS FOR PRODUCING FEMTOSECOND AND PICOSECOND PULSES FROM MODELOCKED FIBER LASERS CLADDING PUMPED WITH BROAD AREA DIODE LASER ARRAYS

[75] Inventors: Martin E. Fermann; Donald J. Harter, both of Ann Arbor, Mich.

[73] Assignee: Imra America, Inc., Ann Arbor, Mich.

[21] Appl. No.: 523,808

[22] Filed: Sep. 5, 1995

[51] Int. Cl.$^6$ ................................................. H01S 3/098
[52] U.S. Cl. ........................ 372/18; 372/11; 372/12; 372/6; 372/105; 372/25; 372/98; 372/102; 372/27; 372/94
[58] Field of Search ............................ 372/18, 11, 12, 372/106, 625, 98, 27, 94, 102

[56] References Cited

U.S. PATENT DOCUMENTS

| | | |
|---|---|---|
| 3,808,549 | 4/1974 | Maurer . |
| 4,815,079 | 3/1989 | Snitzer et al. . |
| 4,829,529 | 5/1989 | Kafka . |
| 5,450,427 | 9/1995 | Fermannet et al. .......... 372/18 |

OTHER PUBLICATIONS

M.E. Fermann, M. Hofer, F. Haberl, A.J. Schmidt and L. Turi, Opt. Lett., vol. 16, No. 4, p. 244 Feb. 15, 1991.
M. E. Fermann, L. M. Yang, M. L. Stock and M. J. Andrejco, Opt. Lett., vol. 19, No. 1 p. 43 Jan. 1, 1994.
E. A. DeSouza, M. N. Islam, C. E. Soccolich, W. Pleibel, R. H. Stolen, J. R. Simpson, D. J. DiGiovanni, Electron, Lett., Vol. 29, No. 5 224 (Mar. 1993).
M. E. Fermann, K. Sugden and I. Bennion, Opt. Lett., vol. 20, No. 2, p. 172 (Jan. 1995).
A.T. Howe, K. A. Stair, H. Iwamura, S. R. Friberg and T. Mukai, Opt. Lett., vol. 20, 471 (Mar. 1995).
M. C. Ferries, K. Sugden, D. C. J. Reid, I. Bennion, A Malony and M. J. Goodwin, Electronics Lett., vol. 30, No. 11 p. 891 (May 1994).
K. J. Weingarten, U. Keller, T. H. Chiu and J. F. Ferguson, Opt. Lett., vol. 18, p. 640 (Apr. 1993).
D. Kopf, K.J. Weingarten, L.R. Brovelli, M. Kamp & U. Keller, Opt. Lett., vol. 19, p. 2143 (Dec. 1994).
H. Zelmer, U. Willian–ikowski, A Tunnerinan and H. Welling, Cleo 95, paper CMB4.
M. Minden et al, Cleo 95, paper CTuR2 (1994).
J.D. Ninelly, W.L. Barnes, R.I. Laming, P.R. Morkel, J.E. Townsend, S.G. Grubb and D.N. Payne, IEEE Photomes Technology Lett., vol. 5, No. 3, p. 301 (Mar. 1993).
H. A. Haus, and E.P. Ippen, Opt. Lett, vol. 16, No. 17, p. 1331, (Sep. 1991).
H. Lin, D. K. Donald, K.W. Chang and S.A. Newton, Cleo 95, paper JTuE1 (1993).

*Primary Examiner*—Leon Scott, Jr.
*Attorney, Agent, or Firm*—Sughrue, Mion, Zinn, Macpeak & Seas

[57] ABSTRACT

A technique for the generation of picosecond (psec) and femtosecond (fsec) pulses from modelocked double-clad fiber lasers cladding pumped with broad area diode laser arrays is disclosed. Using an erbium/ytterbium fiber oscillator, 560 fsec pulses with pulse energies up to 40 pJ are generated at a wavelength of 1560 nm. In a dispersion-compensated cavity, pulses as short as 170 fsec with pulse energies up to 50 pJ are obtained. By adding a negatively chirped fiber Bragg grating for additional intracavity dispersion control, pulse widths of 3 psec with pulse energies up to 1 nJ are obtained. A saturable absorber is used for pulse start up, whereas nonlinear polarization evolution is exploited for steady-state pulse shaping. An environmentally stable design is ensured by employing birefringent fibers and a compensation scheme for linear and nonlinear polarization drifts in the cavity.

25 Claims, 7 Drawing Sheets

APPARATUS FOR PRODUCING FEMTOSECOND AND PICOSECOND PULSES FROM MODELOCKED FIBER LASERS CLADDING PUMPED WITH BROAD AREA DIODE LASER ARRAYS

BACKGROUND OF THE INVENTION

1. Field of the Invention

The present invention relates to modelocked fiber lasers for producing femtosecond and picosecond pulses, and particularly to modelocked fiber lasers employing double-clad fibers pumped with diode laser arrays.

2. Description of the Related Art

Modelocked fiber lasers are generally considered ideal candidates for field-suitable compact sources of both femtosecond and picosecond pulses. However, the eventual commercial success of any ultrafast technology based on fiber lasers depends heavily on the availability of simple laser designs that can compete in cost and complexity with alternative solutions. To this end, passively modelocked fiber lasers are particularly attractive, as they do not require expensive modulators for their operation.

Since passively modelocked fiber lasers were first reported by M. E. Fermann, M. Hofer, F. Haberl, A. J. Schmidt and L. Turi in "Additive-pulse-compression mode locking of a neodymium fiber laser", Optics Letters, Vol. 16, No. 4 (1991), two systems have been developed which hold promise as commercially viable passively modelocked fiber lasers for the production of femtosecond pulses. See, M. E. Fermann, L. M. Yang, M. L. Stock and M. J. Andrejco, "Environmentally stable Kerr-type mode-locked erbium fiber laser producing 360-fs pulses", Optics Letters, Vol. 19, No. 1 (1994), hereinafter denoted as system 1; and E. A. DeSouza et al., "Saturable Absorber Modelocked Polarisation Maintaining Erbium-doped Fibre Laser", Electronics Letters, Vol. 29, No. 5 (1993), hereinafter denoted as system 2.

Two different systems have been developed which hold promise as commercially viable picosecond pulse lasers. See, M. E. Fermann, K. Sugden and I. Bennion, "High-power soliton fiber laser based on pulse width control with chirped fiber Bragg gratings", Optics Letters, Vol 20, No. 2 (1995), hereinafter denoted as system 3; and B. C. Barnett et al., "High-power erbium-doped fiber laser mode locked by a semiconductor saturable absorber", Optics Letters, Vol. 20, No. 5 (1995), hereinafter denoted as system 4.

Systems 2 and 4 rely on a saturable absorber for initiation of modelocking and also for steady-state pulse shaping. In contrast, systems 1 and 3 use a saturable absorber only for the initiation of modelocking, and obtain steady-state pulse shaping by nonlinear polarization evolution in the fiber. Advantageously, systems 1 and 3 additionally include a compensation scheme based on two Faraday rotators, which strongly suppresses linear and nonlinear polarization drifts.

In the picosecond regime, system 3 allows the formation of a wide range of pulse-widths simply by changing the intra-cavity dispersion with a chirped fiber Bragg grating (CFBG). See, e.g., M. C. Farries, K. Sugden, D. C. J. Reid, I. Bennion, A. Malony and M. J. Goodwin in "Very broad reflection bandwidth (44 nm) chirped fibre gratings and narrow bandpass filters produced by the use of an amplitude mask", Electronics Letters, Vol. 30, No. 11 (1994).

While these systems work perfectly well in the laboratory, from a commercial point of view, these systems are still only of limited interest, since these systems require expensive pump sources such as ion or solid-state lasers, master-oscillator power amplifier laser diodes or even high-power pig-tailed single-mode diode lasers. In contrast, passively modelocked solid state lasers that produce similar pulse widths may routinely be pumped with low-cost, broad-area, multi-stripe diode laser arrays, as disclosed by K. J. Weingarten, U. Keller, T. H. Chiu and J. F. Ferguson in "Passively mode-locked diode-pumped solid-state lasers that use an antiresonant Fabry-Perot saturable absorber", Optics Letters, Vol. 18, No. 8 (1993) and D. Kopf, K. J. Weingarten, L. R. Brovelli, M. Kamp and U. Keller in "Diode-pumped 100-fs passively mode-locked Cr:LiSAF laser with an antiresonant Fabry-Perot saturable absorber", Optics Letters, Vol. 19, No. 24 (1994). The feasibility of pumping with diode laser arrays makes passively modelocked solid state lasers very attractive despite their typically significantly larger physical dimensions.

To minimize cost, modelocked fiber lasers also should employ diode laser arrays. Indeed, it has been long known that continuous wave fiber lasers may be pumped by diode laser arrays when a doubleclad structure is employed in the fiber design. See, e.g., U.S. Pat. No. 4,815,079 to Snitzer et al. According to Snitzer et al., the fiber is designed to have two claddings, wherein the outer cladding has a low refractive index and the inner cladding has a significantly higher refractive index, giving a typical numerical aperture for light capture by the inner cladding between 0.20 and 0.60. The fiber core then has an even higher refractive index and is placed inside the inner cladding, such that the core location is significantly offset from the center of the inner cladding.

Snitzer et al. alternatively disclose the inner cladding as having a nearly rectangular shape. Both of these designs ensure that any light launched into the inner cladding crosses over the fiber core as often as possible, so that the light may be efficiently absorbed when the fiber core is doped with a rare-earth gain material. The fiber core may then be designed to be single-mode, and, as a result, a single-mode laser signal output may be obtained when the fiber is placed into a resonator. Note, however, that perfectly acceptable performance from double-clad fibers having a centro-symmetric fiber structure, i.e., a fiber core placed in the center of the inner cladding, was recently demonstrated. H. Zelmer, U. Williamkowski, A. Tunnerman and H. Welling, "High-power cw neodymium-doped double-clad fiber lasers", CLEO 95, paper CMB4. Such pumping schemes were previously predicted in U.S. Pat. No. 3,808,549 to Maurer. The fiber design can then be reduced to that of a standard single-mode fiber with a low-index coating (such as silicone rubber), which, in fact, was the industry standard for fiber fabrication before the advent of acrylate coatings.

Passive modelocking was recently demonstrated in such centro-symmetric double-clad neodymium-doped fibers cladding pumped by multi-stripe diode laser arrays. M. Minden et al., in "Long-pulse coherent waveforms from a fiber laser", CLEO 95, paper CTuR2. Specifically, an unchirped narrow-bandwidth fiber grating was used to limit the bandwidth of the generated pulses and a saturable absorber was used both for pulse initiation and steady-state pulse shaping. However, no schemes for the compensation of linear and nonlinear polarization drifts in the cavity were used, and only pulses with widths of ≈500 psec and longer could be generated. Further, no means for controlling the intra-cavity dispersion and no means for suppressing cladding modes were included in that work. Therefore, in that work as to date, it has not been possible to construct cladding-pumped fiber lasers that produce femtosecond or picosecond pulses.

SUMMARY OF THE INVENTION

It is an object of the present invention to produce femtosecond and picosecond pulses from double-clad fiber lasers pumped with broad area diode laser arrays. The use of double clad fibers greatly simplifies the coupling of pump power to the fiber core, while preserving the option of constructing a high power fiber oscillator. The disclosed and claimed novel system advantageously compensates for the linear birefringence of the double-clad fibers, which results in compensation of linear and nonlinear polarization drifts in such fibers.

Experimental results indicate that guided cladding modes in such fibers tend to inhibit pure passive Kerr-type modelocking (i.e., passive modelocking without the use of a saturable absorber) even when mode-strippers are employed. The disclosed embodiments demonstrate optimum positions for the incorporation of mode-strippers. The oscillation of femtosecond and picosecond soliton pulses in the oscillator of the present invention is ensured by using an appropriate amount of dispersion in the cavity and using a combination of pulse shaping induced by nonlinear polarization evolution and a saturable absorber. In alternative arrangements, the system includes actively modelocked fiber lasers, fiber ring lasers and more general cavity designs.

BRIEF DESCRIPTION OF THE DRAWINGS

The above and other objects and advantages of the invention will become more apparent and more readily appreciated from the following detailed description of the presently preferred exemplary embodiments of the invention taken in conjunction with the accompanying drawings, of which:

FIG. 2 depicts autocorrelation traces (FIG. 2A) and corresponding pulse spectra (FIG. 2B) of generated pulses with a FWHM width of 560 fsec;

FIG. 3 illustrates autocorrelation traces (FIG. 3A) and corresponding pulse spectra (FIG. 3B) of generated pulses with a FWHM width of 3 psec;

DETAILED DESCRIPTION OF THE PREFERRED EMBODIMENTS

Figure 1:
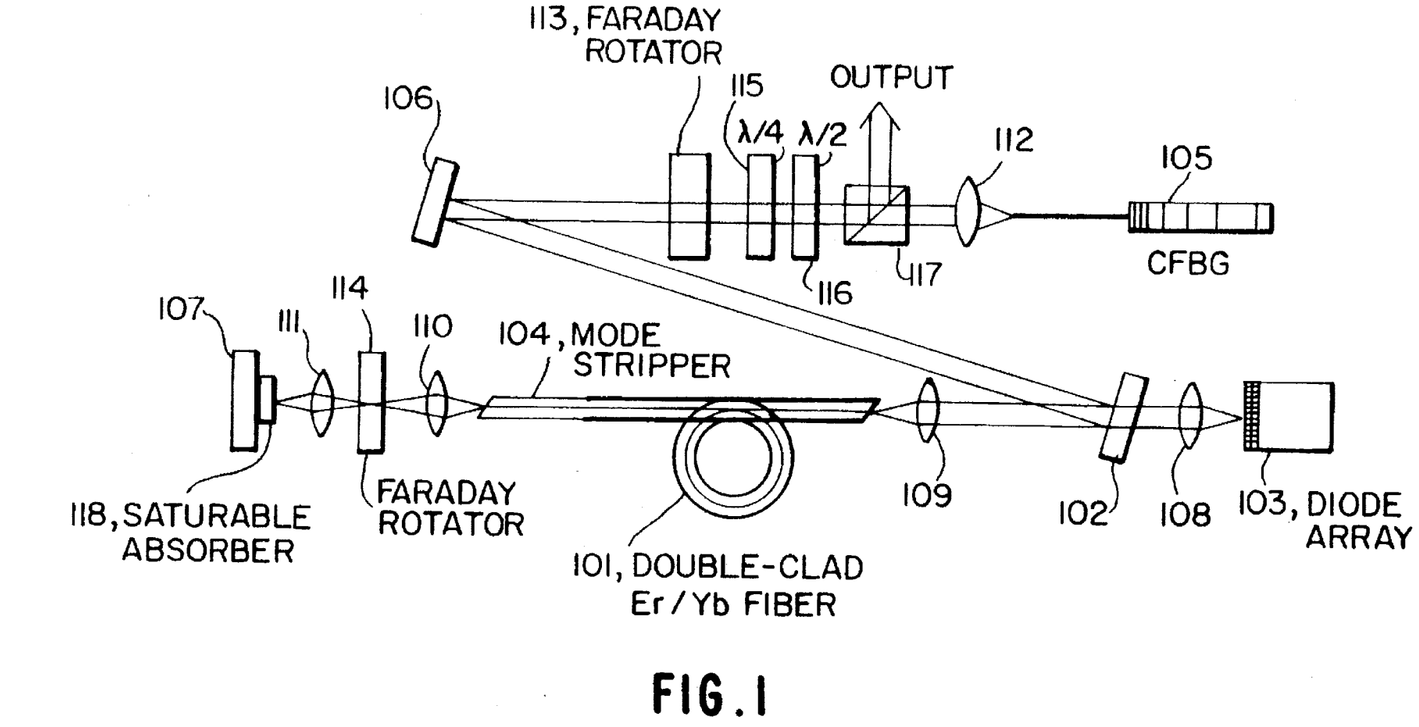
FIG. 1 illustrates the configuration of a cladding pumped passively modelocked fiber laser system according to a first embodiment of the present invention.

FIG. 1 illustrates the configuration of a cladding pumped passively modelocked fiber oscillator producing femtosecond or picosecond pulses according to a first embodiment of the present invention. In the system of the first embodiment, no attempt is made to compensate for the dispersion of the gain fiber; a dispersion-compensated cavity will be described below in conjunction with FIG. 4. In the arrangement of FIG. 1, a single piece of $Er^{3+}$-doped fiber 101 sensitized by $Yb^{3+}$ is used as a gain medium to allow pumping of the $Er^{3+}$ via energy transfer from $Yb^{3+}$. See, *IEEE Photonics Technology Letters*, "Diode-Array Pumping of $Er^{3+}/Yb^{3+}$ Co-doped Fiber Lasers and Amplifiers", J. D. Minelly et al., Vol. 5, No. 3 (1993).

One preferable configuration of the fiber 101 includes $Er^{3+}$ and $Yb^{3+}$ doping levels of 800 ppm and 8000 ppm, respectively, in a phosphoaluminosilicate glass host. The core diameter of the fiber 101 is 6 μm, with a numerical aperture (NA) of 0.16. The inner cladding has a diameter of 100 μm and is coated with silicon rubber to give the inner cladding an effective NA of 0.4. According to this configuration, the fiber core is centered in the middle of the fiber 101 to allow the option of making low-loss splices to the double-clad fiber 101. Nevertheless, an efficient absorption of skew rays from the pump laser is achieved by coiling the fiber 101 onto a drum with a diameter of 3.5 cm; consequently, the fiber length in the oscillator can be reduced to 7.7 m. The inventors of the instant invention have experimentally found that good laser performance can be obtained with gain fiber lengths between 5–10 m. Due to a small ellipticity of the fiber core and residual stresses between the fiber core and cladding from the manufacturing process, such a fiber has been found to exhibit a birefringence of $\Delta n \approx 1.5 \times 10^{-6}$, giving rise to a beat length of ≈10 cm at the signal wavelength of 1.56 μm.

With continued reference to FIG. 1, the fiber 101 is pumped through lenses 108 and 109 and a dichroic mirror 102 with a standard 1 W, 100×1 μm broad area diode laser array 103 operating at a wavelength of 976 nm. Dichroic mirror 102 can have, for example, a transmission of >80% at the wavelength of 976 nm, thereby allowing transmission of the pump light, and a reflectivity >98% at the signal wavelength of 1.56 μm, thereby reflecting the signals emerging from the fiber 101 and reflected from mirror 106. Using an imaging system (the lenses 108 and 109) with a magnification of 1, a coupling efficiency up to 60% into the inner cladding of the active fiber 101 can be achieved. The curvatures of mirrors 102 and 106 and the focal lengths of the lenses 108 and 109 are preferably selected to give optimum coupling of the pump light from the diode array 103 into the double-clad fiber 101.

As shown in FIG. 1, a mode stripper 104 is incorporated at the opposite end of the fiber 101 by replacing the silicone rubber coating with a high-index substance such as acrylate or a liquid with a refractive index higher than the inner cladding. The mode stripper 104 operates to strongly attenuate cladding modes in the oscillator. The ends of the double-clad fiber 101 are cleaved at an angle of approximately 10° to prevent feedback into the diode laser array 103 and to eliminate unwanted feedback into the double-clad fiber 101.

The chirped fiber Bragg grating (CFBG) 105, which is described in greater detail below, is shown at one end of the cavity in FIG. 1. The focal length of the lens 112 is selected to give optimum coupling of the signal light into the CFBG 105. As an alternative, the system according to the first embodiment optionally can be implemented by replacing CFBG 105 with a mirror (not shown). In this arrangement, the curvature of the mirror is preferably selected, along with the focal length of lens 112, to give optimum reflection of the signal light from the mirror back into the core of the double-clad fiber 101.

To compensate for linear polarization drifts in the fiber cavity, the cavity design preferably includes two Faraday rotators 113 and 114, as employed in system 1 described above. Despite the low birefringence of the fiber 101, once coiled, it was found that environmentally-induced nonlinear polarization changes could also be minimized in the fiber 101. This advantageously permits the use of nonlinear polarization evolution as the steady state modelocking mechanism (see system 1), while still preserving an environmentally stable cavity design. As in the above-described system 1, the required phase bias between the two polarization eigenmodes of the fiber can be achieved by positioning the quarter-wave plate 115 and half-wave plate 116 as shown and rotating them to an appropriate angle.

Without the CFBG 105, the dispersion of the cavity is governed dominantly by the fiber dispersion and has been estimated as $D_2 \approx 0.2$ psec$^2$ i.e., the fiber was soliton supporting. The intra-cavity dispersion can be lowered by optionally inserting the 5 mm long negatively chirped CFBG 105 as shown in FIG. 1. The grating 105 preferably has a bandwidth of $\approx 17$ nm, centered at $\approx 1.56$ µm, a dispersion of $-3.40$ ps$^2$ and a peak reflectivity of $\approx 90\%$. The light rejected at the intracavity polarizer 117 is usable as the signal output. A rotatable quarter-wave plate (not shown) optionally can be inserted between polarizer 117 and CFBG 105 (or the optional mirror) to obtain adjustable output coupling in the direction opposite to that shown in FIG. 1.

Without the fiber grating 105 (i.e, with a mirror), the fiber laser was found to produce a maximum cw output power of 60 mW; a fiber output which is very nearly diffraction limited (to within more than 99%). However, due to the double-clad structure, cladding modes typically are not completely suppressed, even in the presence of the mode stripper 104. Further, scattered light from the fiber core (due to fiber inhomogeneities and the strong bend applied to the fiber 101) can also be trapped in the cladding and lead to a very low-level incoherent background at the fiber output particularly at any fiber discontinuities (e.g. fiber splices), a fraction of this background, proportional to 1/N, where N is the total number of modes in the cladding, can couple back into the fundamental mode.

The low-level incoherent background acts as a strong injection signal for cw operation of the laser, and, therefore, the initiation of modelocking under such conditions is typically difficult, as reported by H. A. Haus and E. P. Ippen, *Optics Letters*, Vol. 16, p. 1331 (1991). In fact, the inventors of the instant invention found that any attempts to initiate Kerr-type modelocking in the above-described cavity by oscillating one of the cavity mirrors (as was done in system 1) failed.

According to the present invention, modelocking can be initiated by incorporating a saturable absorber 118 at one end of the cavity, as shown in FIG. 1. The saturable absorber 118 can be based on InGaAsP as in systems 2 and 4 (see also, H. Lin et al., CLEO 95, Paper JTuE1). The radiation treatment is required to reduce the life-time of the saturable absorber; generally, the present inventors found that the carrier life-time of the saturable absorber preferably is about ten times shorter than the cavity round-trip time in the laser.

Lenses 111 and 110 can be used to focus the signal light onto the saturable absorber, where a focal spot diameter of between 2 and 30 µm on the absorber is preferably used in this particular system.

In the presence of the saturable absorber 118, self-starting modelocked operation can be reliably obtained, though the laser is still polarization sensitive (i.e. sensitive to the setting of the quarter and half-wave plates 115 and 116), which indicates that the absorber 118 governs the start-up characteristics of the modelocking process, whereas nonlinear polarization evolution predominantly governs the steady-state pulse shaping. Note, however, that both nonlinear polarization evolution and the saturable absorber 118 play a strong role in the pulse formation processes.

A decrease in polarization sensitivity of the system can be achieved by decreasing the focal spot diameter on the saturable absorber 118. However, this results in an attendantly lower damage threshold of the saturable absorber 118. Therefore, to strike a compromise, the focal spot diameter on the saturable absorber is preferably optimized somewhere in the region between 2 and 30 µm, depending on whether the polarization sensitivity or the damage threshold are considered most important for a specific system.

Likewise, the removal of the Faraday rotators results in a great reduction in the stability of the laser, as the large birefringence in the fiber 101 prevents the formation of any stable pulse shaping by nonlinear polarization evolution. The only stable pulses obtainable in this case have widths of the order of tens of psec, which indicates that they are predominantly shaped by the saturable absorber, whereas the contribution of nonlinear polarization evolution is insignificant.

Figure 2A:
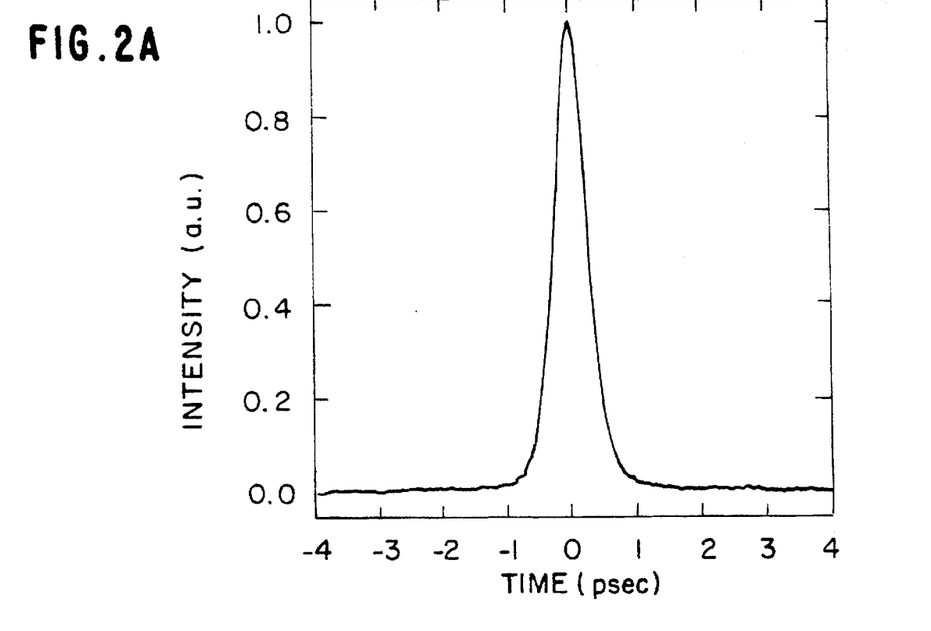
Figure 2B:
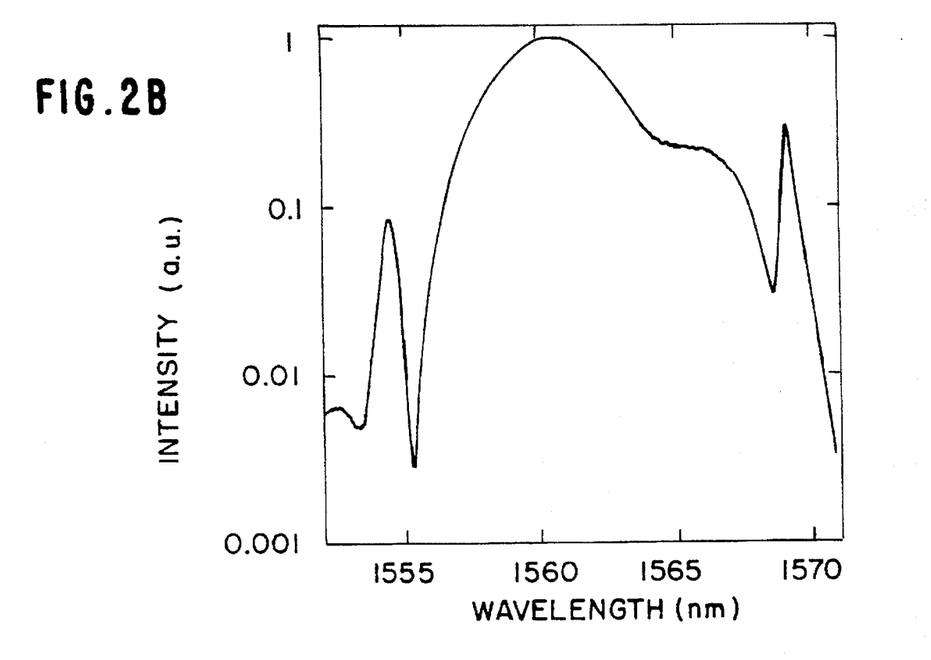

Referring now to FIG. 2, an autocorrelation trace (FIG. 2A) and the corresponding spectrum (FIG. 2B) of the pulses generated with the cavity design from FIG. 1 in absence of the fiber grating 105 are shown. The pulse width is 560 fsec and the time-bandwidth product is 0.32, assuming a sech$^2$-shape. The pulse energy is 40 pJ. At the repetition rate of 13 MHz, this corresponds to an average output power of 500 µW. In this configuration, single pulse operation can be ensured by operating the diode laser at a pump power of only $\approx 150$ mW. The maximum stability regime for single pulse operation in this case is obtained for an applied pump power between 148 and 151 mW, i.e., the pump power must be controlled to within $\pm 1\%$.

Figure 3A:
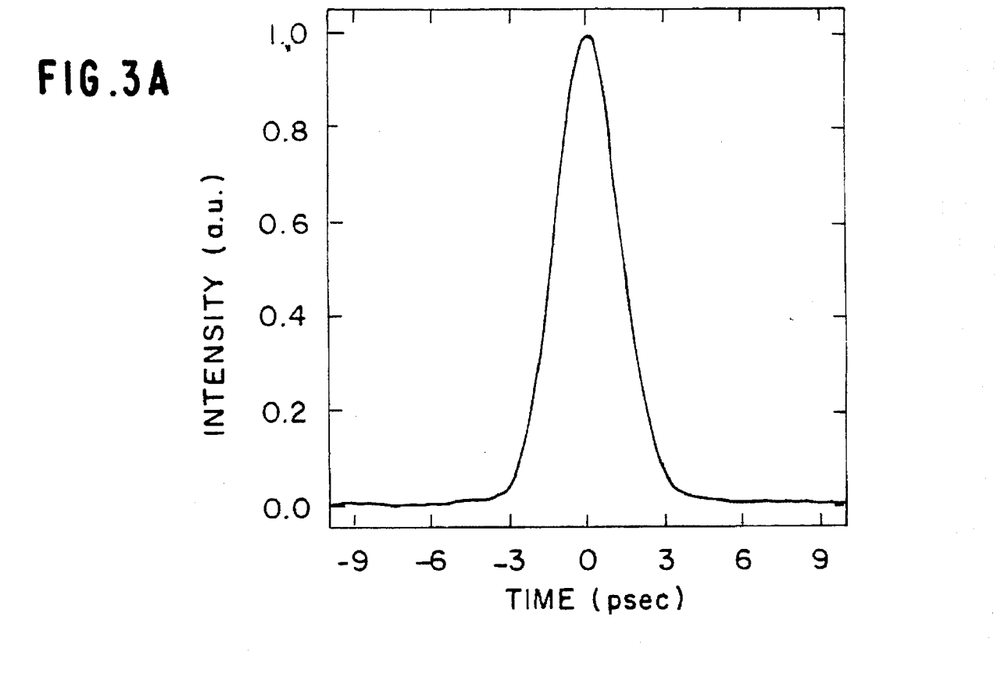
Figure 3B:
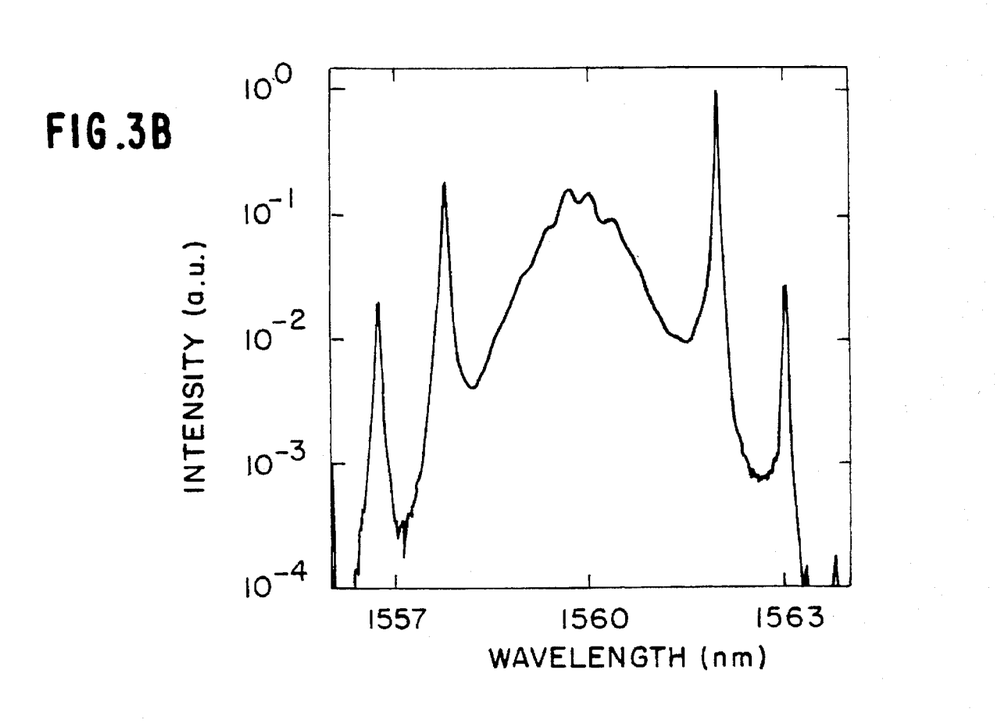

Referring now to FIG. 3, an autocorrelation trace (FIG. 3A) and the corresponding spectrum (FIG. 3B) of the pulses generated in the presence of the fiber grating 105 (as depicted in FIG. 1) are shown. The pulse width is 3 psec and the time-bandwidth product is 0.32 assuming a sech$^2$-shape. The pulse energy is 1 nJ. At the repetition rate of 13 MHz, this corresponds to an average output power of 13 mW. In this configuration, single pulse operation can be ensured by operating the diode laser at a pump power of $\approx 800$ mW. Here, the pump power must be controlled to within only $\pm 10\%$ (i.e., 730–880 mW) to ensure single pulse operation. In the presence of the fiber grating 105, the laser of the present invention operates satisfactorily in the absence of the mode-stripper 104, as sufficiently efficient mode-stripping is performed by the single-mode fiber located in front of the fiber grating 105.

Figure 4:
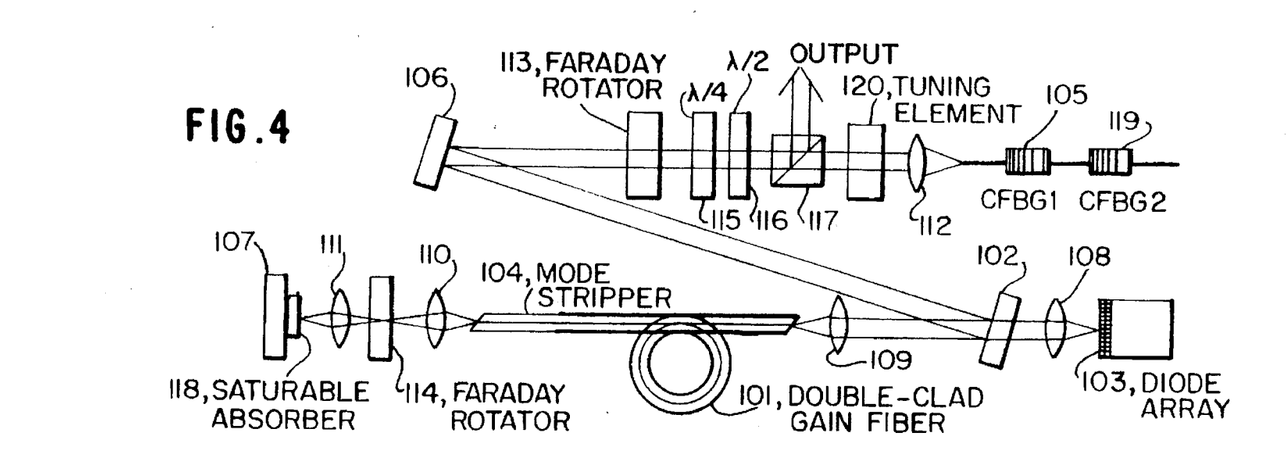
FIG. 4 illustrates the configuration of a cladding pumped passively modelocked fiber laser system according to the first embodiment of the present invention, which included a tuning element and a second Bragg grating.

The configuration of the first embodiment serves only as an example of a specific cavity design that allows the generation of femtosecond and picosecond pulses. Equally, any other rare-earth doped double-clad fiber may be used as a gain medium and may also be passively modelocked to produce picosecond and femtosecond pulses. To ensure operation of the system in the soliton regime, a negatively chirped fiber Bragg grating may be added. Further, wavelength tuning elements can readily be included between the polarizer 117 and lens 112 to tune the emission wavelength of the laser. Similarly, wavelength tuning elements can be included in any of the disclosed embodiments. The wavelength tuning elements can be selected from many suitable devices, such as etalons, optical filters, birefringent tuning plates and bulk gratings. By combining one (or more) wavelength tuning elements with a second (or more) Bragg gratings, pulses operating at two (or more) different wavelengths may also be obtained. An example of a cavity design incorporating two Bragg gratings 105 and 119 and a wavelength tuning element 120 is shown in FIG. 4. Note, however, that the second Bragg grating may be omitted if only a wavelength-tunable single-wavelength laser is sought.

Figure 5:
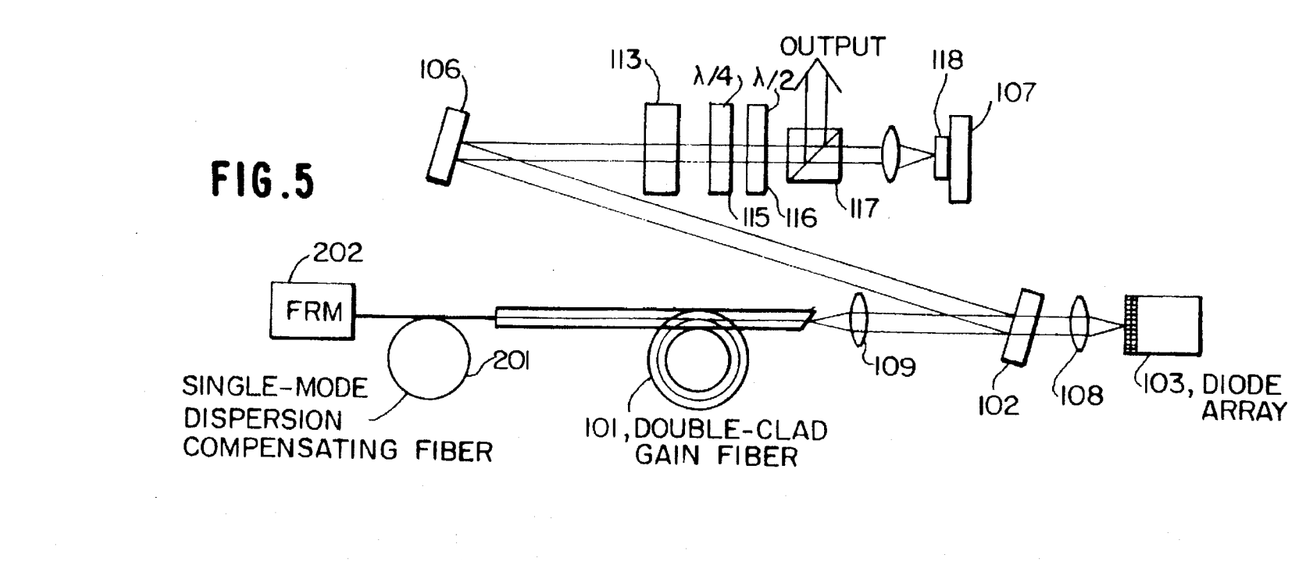
FIG. 5 illustrates the configuration of a cladding pumped passively modelocked fiber laser system having a dispersion-compensated cavity according to a second embodiment of the present invention.

FIG. 5 illustrates a second embodiment of the present invention. In FIGS. 5–11, elements similar to those shown in previous figures have the same reference numerals. According to this embodiment, for femtosecond pulse generation, simplification of the system can be realized by placing the saturable absorber 118 at one end of the cavity, behind the polarizer 117, and by positioning an integrated Faraday rotator mirror (FRM) 202 at the other end of the cavity, as shown in FIG. 5. Pulses limited by the bandwidth of the gain medium (i.e., fiber 101) can be obtained by combining a length of negative (positive) dispersion cladding pumped fiber with a length of positive (negative) undoped standard single mode fiber 201 to give a total cavity dispersion of zero. Here, it is also advantageous to locate any non-birefringent fiber directly in front of the FRM 202 to minimize the environmental sensitivity of the cavity. By way of example, a 5 m length of the Er/Yb fiber 101 (as discussed with reference to FIG. 1) and a length of 0.80 m of high-positive dispersion fiber 201 can be used to give a total cavity dispersion of approximately zero. In this case, bandwidth-limited gaussian-shaped pulses with pulse energies up to 50 pJ and pulse widths as low as 170 fsec are achievable.

Figure 6:
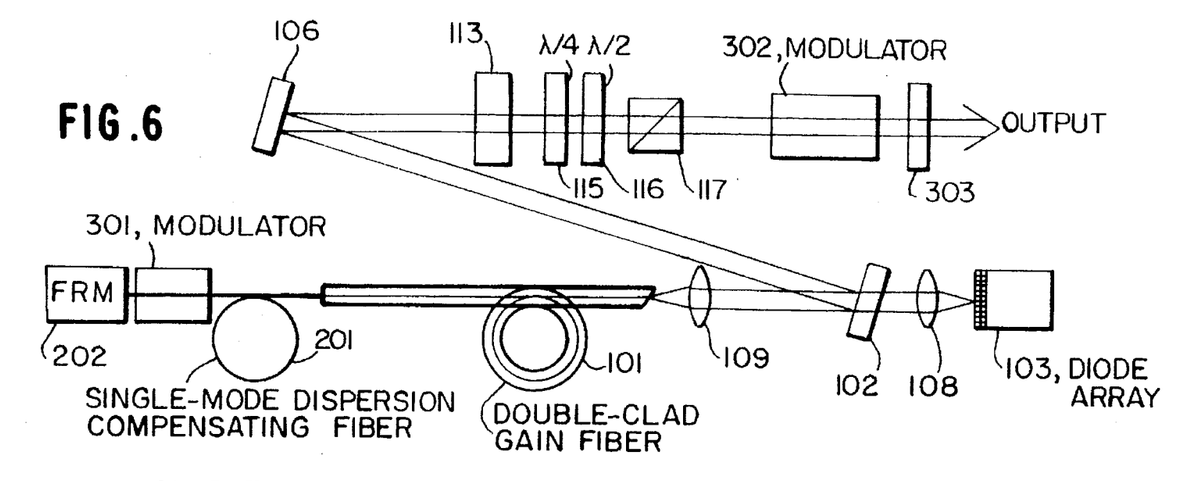
FIG. 6 illustrates the configuration of a cladding pumped actively modelocked fiber laser system according to a third embodiment of the present invention.

Referring to FIG. 6, a configuration according to a third embodiment is presented. By inserting an additional acousto-optic or electro-optic modulator in the cavity, an actively modelocked cladding pumped fiber laser may be constructed. Such modulators 301, 302 may be conveniently placed at either the right or left end of the cavity as shown in FIG. 6. Preferably, a fiber pig-tailed modulator can be inserted only at the left-hand side of the cavity to ensure a compact system. Mirror 303 could then be selected to only partially reflect the signal light and could thus be used as an output coupling.

Figure 7:
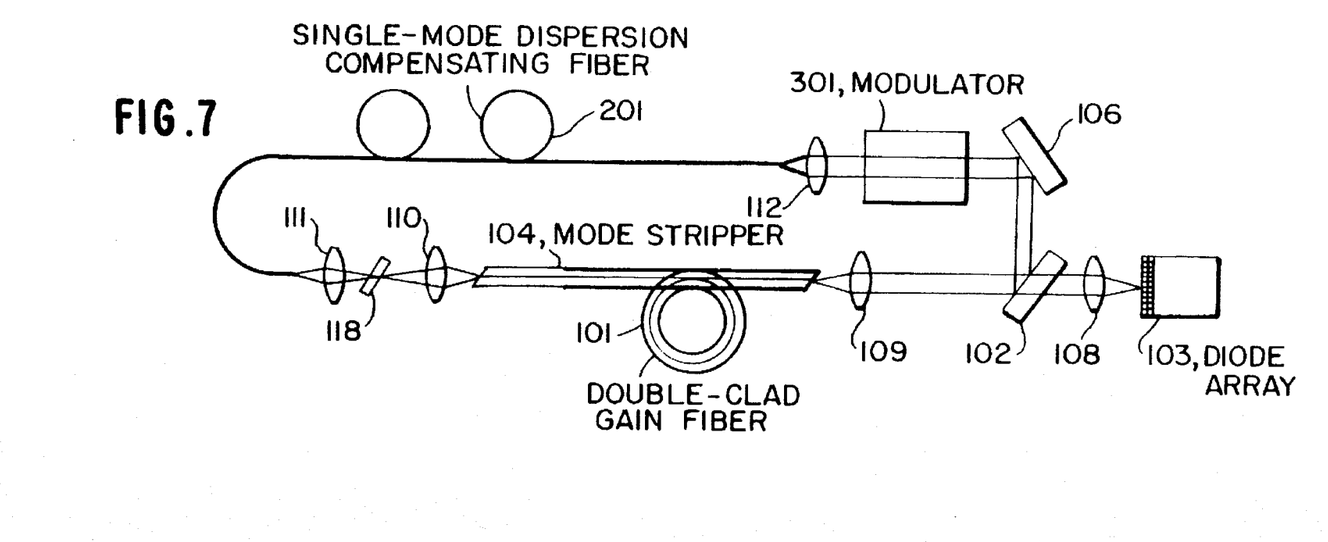
FIG. 7 illustrates the configuration of a cladding pumped actively modelocked fiber laser system having a ring cavity according to a fourth embodiment of the present invention.

FIG. 7 illustrates a fourth embodiment of the present invention. As shown in FIG. 7, the double-clad fiber 101 may also be part of a ring cavity to obtain a modelocked ring laser. In principle, colliding pulse modelocked operation may in this case be obtained by placing the saturable absorber 118 between lenses 111 and 110 as shown. Note, however, that linear polarization drifts in this cavity are not compensated and, therefore, the long-term-stability of this cavity may be limited. However, in this type of cavity, a modulator 301 may be placed anywhere within the ring traversed by the signal light. The environmental stability of the ring cavity can be ensured by using highly birefringent fiber throughout the cavity. To ensure oscillation of the laser in a single polarization state, a polarizer (not shown) can be inserted with its axes aligned with one of the fiber axes. A laser output could be obtained by making either of mirrors 102 or 106 partially reflective or by splicing a fiber coupler to the fiber 201.

Figure 8:
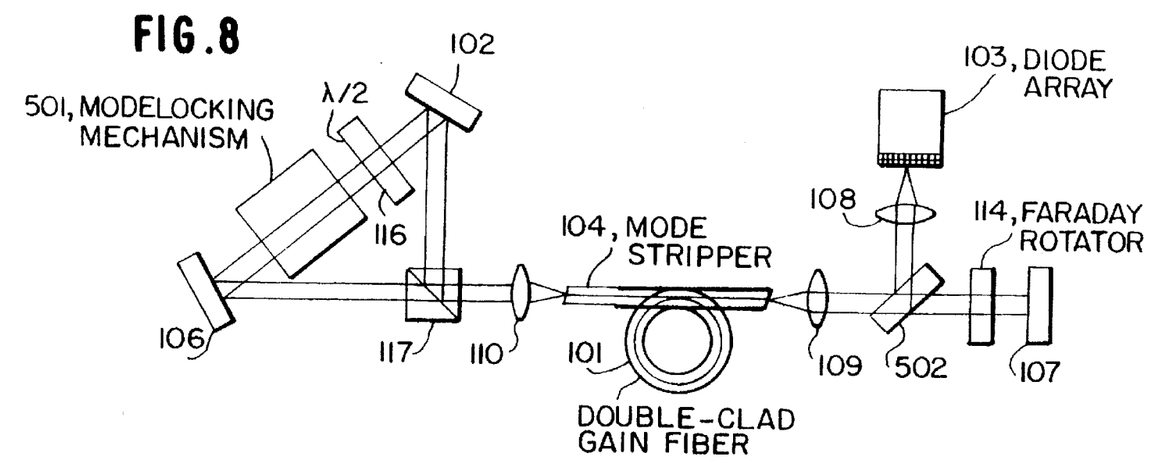
FIG. 8 illustrates a double-pass configuration of a cladding pumped modelocked fiber laser system according to a fifth embodiment of the present invention.

In a fifth embodiment, the double-clad fiber 101 is incorporated into of a variety of cavity designs where the double-clad fiber 101 is used in a double-pass configuration in conjunction with a Faraday rotator mirror to compensate for polarization drifts in the cavity. A generic design of such a cavity is shown in FIG. 8. The modelocking mechanism 501 disposed between mirrors 102 and 106 can be an all-optical switch, a phase or amplitude modulation induced by an external optical pulse source, an acousto- or electro-optic modulator or a saturable absorber. Note that any length of single mode fiber may also be attached to the double clad fiber via splicing. Here, a cavity design is shown, where the dichroic pump mirror 502 is used in transmission for the signal light. A dichroic pump mirror can also be used which reflects signal light and transmits pump light. A laser output could be obtained by making either of mirrors 102 or 106 partially reflective.

Figure 9:
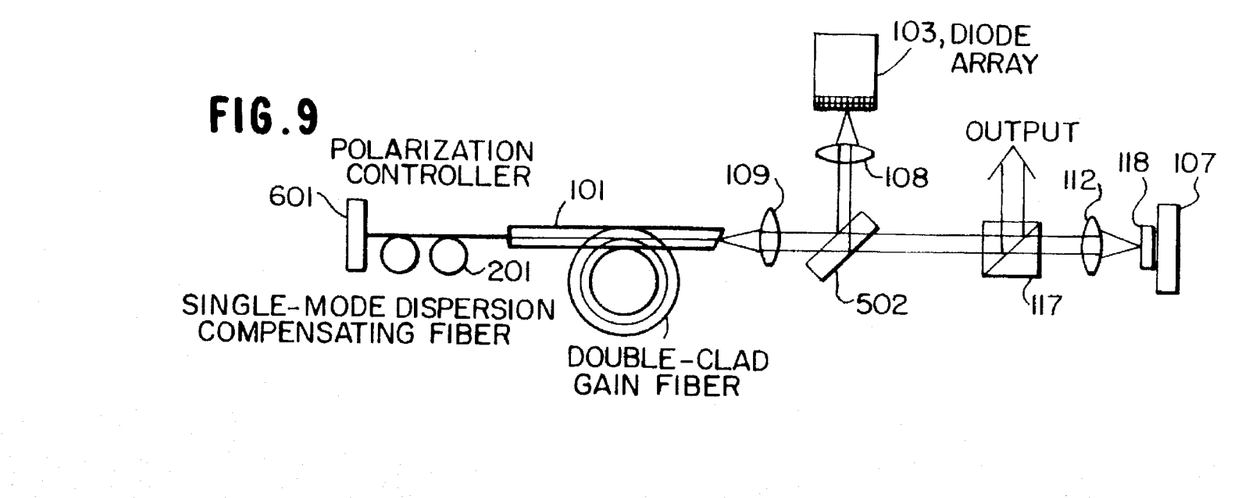
FIG. 9 illustrates the configuration of a cladding pumped passively modelocked fiber laser system according to a sixth embodiment of the present invention.

According to a sixth embodiment, a low birefringence double-clad fiber is constructed to form a femtosecond laser system by removing the Faraday rotators, as shown in FIG. 9. Alternatively, with an optimized fiber and saturable absorber design, the saturable absorber 118 may also be directly abutted to the mirror 601. Mirror 107 then will not include a saturable absorber. Mirror 502 could also be eliminated in principle and the pump light could be coupled into the cavity with a single dichroic polarizer (not shown).

Figure 10:
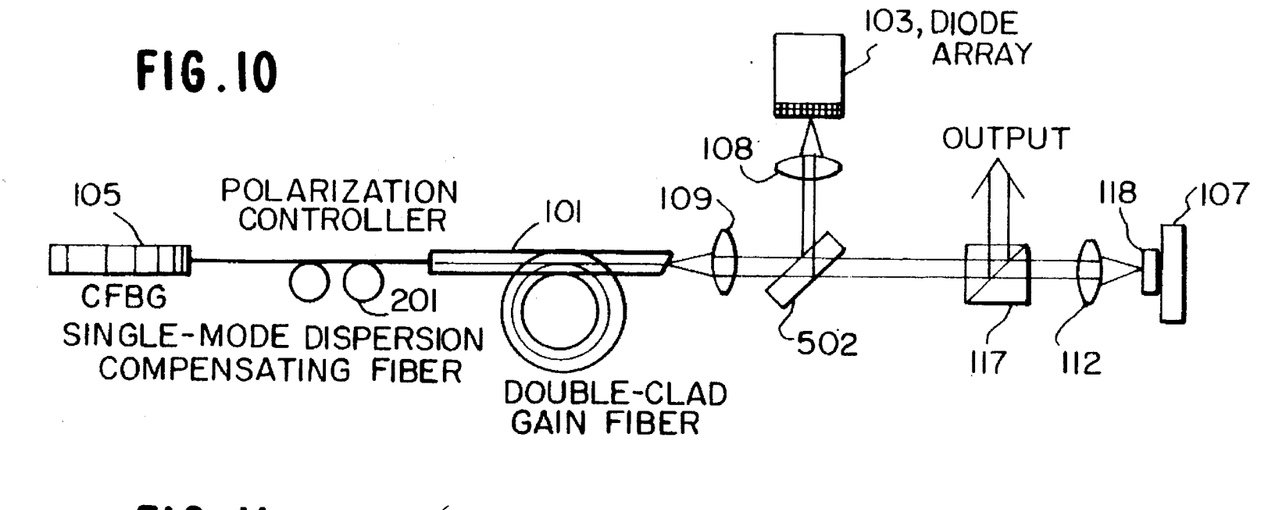
FIG. 10 illustrates an alternate configuration of a cladding pumped passively modelocked fiber laser system according to a sixth embodiment of the present invention.

Once the Faraday rotators are removed, the CFBG 105 can be spliced to the double clad fiber 101 as shown in FIG. 10. Note that by making the dispersion of the CFBG very small, a femtosecond laser may also be constructed in this fashion. The output in such a laser may conveniently be obtained at a polarizer 117, where the all-fiber polarization controller can be adjusted to give the desired output. Note, however, that, as in a ring cavity, the long-term stability of such systems will be limited, since linear polarization changes are not compensated in the fiber cavity. Such stability problems may be overcome by using a saturable absorber with a short carrier life-time (<100 psec). Alternatively, the whole cavity can be made of highly birefringent fiber. As in the ring cavity, all fibers should then have their polarization axes aligned and the polarizer should also be aligned with one of the polarization axes of the fibers. Output coupling can then be obtained from a polarization maintaining coupler.

Figure 11:
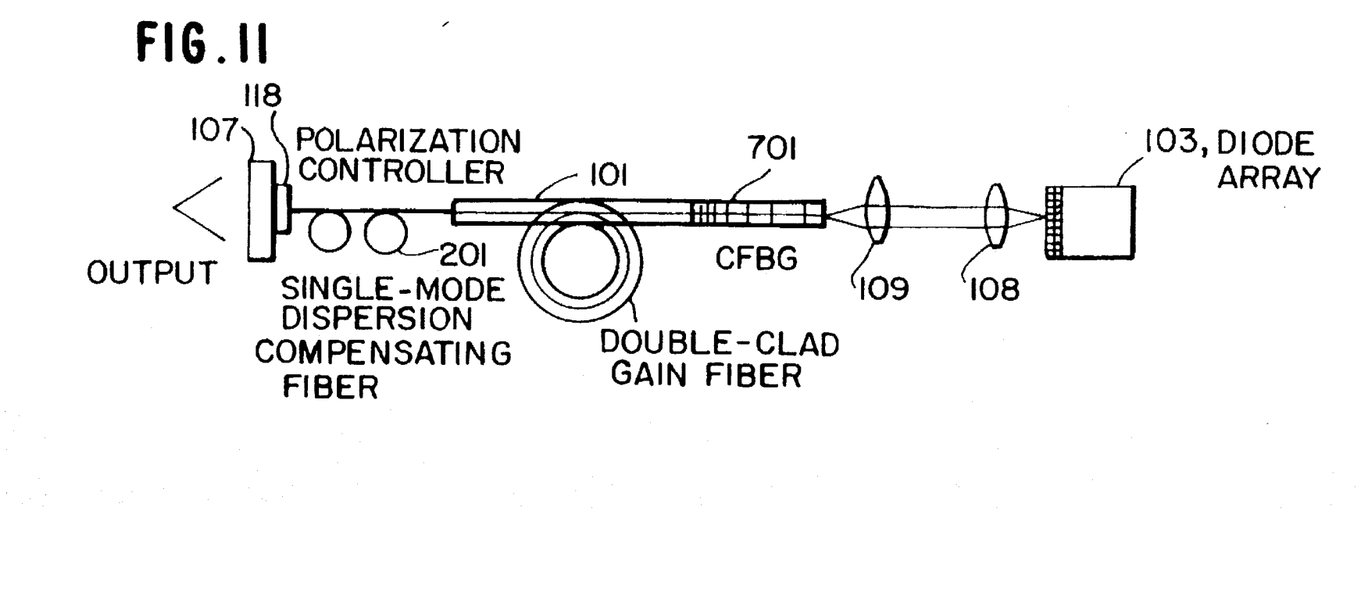
FIG. 11 illustrates a configuration of a cladding pumped passively modelocked fiber laser system according to a seventh embodiment of the present invention.

According to a seventh embodiment, with the Faraday rotators removed, a CFBG 701 can be formed directly in the fiber 101 to produce a picosecond (or femtosecond) laser system, as shown in FIG. 11. The saturable absorber 118 can be abutted directly to the one end of the cavity to give a very compact system. Mirror 107 and the saturable absorber 118 can be made to be partially reflective to allow output coupling. Alternatively, a fiber coupler can be inserted in front of mirror 107 to produce output coupling.

In conclusion, femtosecond and picosecond pulse generation in double-clad rare-earth-doped fibers pumped by broad-area diode array lasers have been demonstrated for the first time. The predominant use of low-cost cavity components should greatly enhance the competitiveness of this technology. Although several exemplary embodiments have been herein shown and described, those of skill in the art will recognize that many modifications and variations are possible, and it is intended to measure the invention only by the appended claims.

What is claimed is:

1. A modelocked laser, comprising:
   a double-clad fiber disposed within a cavity and operating as a gain medium, which generates laser energy in the form of pulses shorter than 100 psec;
   a diode laser array coupled to one end of said double-clad fiber, which pumps said double-clad fiber with pump light;
   reflecting means disposed within the cavity to reflect energy along an axis which passes through said double-clad fiber;
   output means for receiving laser energy generated within the cavity and for outputting a portion of said laser energy;
   modelocking initiation means for initiating production of short pulses in the cavity;
   means for suppressing cladding modes in said double-clad fiber; and
   means for controlling dispersion in the cavity.

2. The modelocked laser according to claim 1, wherein said modelocking initiation means includes a semiconductor saturable absorber.

3. The modelocked laser according to claim 2, wherein the semiconductor saturable absorber is disposed at one end of the cavity and is partially reflective so as to produce an output coupling.

4. The modelocked laser according to claim 2, wherein fibers contained within the cavity have a birefringence of less than $5 \times 10^{-7}$, and wherein the semiconductor saturable absorber has a carrier life-time of less than 100 psec.

5. The modelocked laser according to claim 1, wherein said modelocking initiation means is an acousto-optic or electro-optic modulator which induces an amplitude or phase modulation with an external optical pulse source.

6. The modelocked laser according to claim 1, further comprising means for compensating linear phase drifts within said double-clad fiber.

7. The modelocked laser according to claim 6, wherein said double-clad fiber has a birefringence greater than $1 \times 10^{-7}$ to stabilize nonlinear pulse shaping by nonlinear polarization evolution in the presence of said means for compensating linear phase drifts in the cavity.

8. The modelocked laser according to claim 7, further comprising a quarter-wave plate and a half-wave plate which are used to control linear phase delay between two polarization eigenmodes of said double-clad fiber.

9. The modelocked laser according to claim 6, wherein said means for compensating linear phase drift comprises first and second Faraday rotators disposed within the cavity, the first Faraday rotator being located towards one end of the cavity, and the second Faraday rotator being located towards another end of the cavity, said laser further comprising a polarizer disposed between the first Faraday rotator and said one end of the cavity.

10. The modelocked laser according to claim 9, further comprising a quarter-wave plate and a half-wave plate which are used to control linear phase delay between two polarization eigenmodes of the double-clad fiber.

11. The modelocked laser according to claim 9, further comprising a half-wave plate located between said polarizer and said one end of the cavity, said half-wave plate providing adjustable output coupling.

12. The modelocked laser according to claim 6, wherein said means for compensating linear phase drift comprises a first Faraday rotator located towards one end of the cavity, and a Faraday rotator mirror located at another end of the cavity, said modelocked laser further comprising a polarizer disposed between the first Faraday rotator and said one end of the cavity.

13. The modelocked laser according to claim 12, further comprising a low birefringence fiber having a birefringence of less than $1 \times 10^{-7}$ said low birefringence fiber being located in front of said Faraday rotator mirror.

14. The modelocked laser according to claim 1, wherein said means for controlling dispersion is a dispersion compensating fiber.

15. The modelocked laser according to claim 14, wherein the dispersion compensating fiber is spliced at one end of the cavity.

16. The modelocked laser according to claim 1, wherein said means for controlling dispersion is a chirped fiber Bragg grating.

17. The modelocked laser according to claim 16, where the chirped fiber Bragg grating is formed directly in said double-clad fiber, such that said double-clad fiber is pumped through the chirped fiber Bragg grating.

18. The modelocked laser according to claim 16, wherein the chirped fiber Bragg grating is spliced at one end of the cavity.

19. The modelocked laser according to claim 16, further comprising a second chirped fiber Bragg grating disposed within the cavity.

20. The modelocked laser according to claim 1, wherein said double-clad fiber is a glass-fiber doped with a rare-earth material.

21. The modelocked laser according to claim 1, wherein said output means is a fiber coupler used for output coupling.

22. The modelocked laser according to claim 1, wherein fibers contained within the cavity are polarization-maintaining, having a linear birefringence greater than $5 \times 10^{-7}$ and having polarization axes which are aligned, said laser further comprising a polarizer having its axes aligned with one of the polarization axes of the fibers.

23. The modelocked laser according to claim 1, wherein the cavity is a ring cavity, and said modelocked laser further comprises single-mode fibers and a modelocking mechanism which are disposed within the ring cavity.

24. The modelocked laser according to claim 1, further comprising:
   a Faraday rotator mirror providing compensation for linear phase drifts in said double-clad fiber; and
   a polarizer and a half-wave plate which, in combination, provide compensation for the 90° polarization rotation induced by the Faraday rotator mirror.

25. The modelocked laser according to claim 1, further comprising tuning means for wavelength tuning an output wavelength, said tuning means comprising at least one of etalons, optical filters, birefringent tuning plates and bulk gratings.

* * * * *